(12) United States Patent
Brink et al.

(10) Patent No.: US 12,108,736 B2
(45) Date of Patent: Oct. 8, 2024

(54) METHOD AND CONTROL ARRANGEMENT FOR OPERATING AN AUTONOMOUS AGRICULTURAL VEHICLE

(71) Applicant: DELAVAL HOLDING AB, Tumba (SE)

(72) Inventors: Marek Brink, Tumba (SE); Bartlomiej Jaklik, Tumba (SE); Bartlomiej Slusarczyk, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 17/780,802

(22) PCT Filed: Nov. 24, 2020

(86) PCT No.: PCT/SE2020/051115
§ 371 (c)(1),
(2) Date: May 27, 2022

(87) PCT Pub. No.: WO2021/107838
PCT Pub. Date: Jun. 3, 2021

(65) Prior Publication Data
US 2022/0408684 A1    Dec. 29, 2022

(30) Foreign Application Priority Data
Nov. 28, 2019    (SE) .................... 1951367-0

(51) Int. Cl.
*A01K 1/01* (2006.01)
*A01B 69/04* (2006.01)
*G05D 1/00* (2006.01)

(52) U.S. Cl.
CPC .............. *A01K 1/01* (2013.01); *A01B 69/008* (2013.01); *G05D 1/0217* (2013.01)

(58) Field of Classification Search
CPC ....... A01K 1/01; A01B 69/008; G05D 1/0217
See application file for complete search history.

(56) References Cited

U.S. PATENT DOCUMENTS

2009/0194137 A1    8/2009   Friedman
2012/0103367 A1    5/2012   Tang
(Continued)

FOREIGN PATENT DOCUMENTS

DE    102017109130 A1    10/2018
EP    2169501             3/2010
(Continued)

OTHER PUBLICATIONS

International Search Report for PCT/SE2020/051115 dated Feb. 11, 2021, 3 pages.
(Continued)

*Primary Examiner* — Yuen Wong
(74) *Attorney, Agent, or Firm* — NIXON & VANDERHYE

(57) ABSTRACT

An autonomous agricultural vehicle that operates in accordance with a cleaning plan, a method for operating the vehicle, and a computer program related to operating the vehicle, wherein while the vehicle is operated, a load quantity representing an amount of material moved by the cleaning device is monitored at a plurality of individual times, and the cleaning plan of the autonomous agricultural vehicle is adjusted based on a variation in the monitored load quantity among the individual times.

19 Claims, 6 Drawing Sheets

(56) References Cited

U.S. PATENT DOCUMENTS

| | | |
|---|---|---|
| 2012/0226407 A1 | 9/2012 | Noordam |
| 2014/0124000 A1* | 5/2014 | Hillforth ............. A47L 11/4044 |
| | | 15/340.1 |
| 2018/0070787 A1 | 3/2018 | Gordon |
| 2019/0045992 A1 | 2/2019 | Brede |
| 2019/0204851 A1 | 7/2019 | Afrouzi |

FOREIGN PATENT DOCUMENTS

| | | |
|---|---|---|
| EP | 2 731 420 | 5/2014 |
| EP | 3 488 690 | 5/2019 |
| GB | 2529166 | 2/2016 |
| GB | 2567040 A | 4/2019 |
| WO | 0036904 A1 | 6/2000 |
| WO | 03024292 A2 | 3/2003 |
| WO | 2004/064504 | 8/2004 |
| WO | 2011/062481 | 5/2011 |
| WO | 2013/010785 | 1/2013 |
| WO | 2015170967 A1 | 11/2015 |
| WO | 2016023716 A1 | 2/2016 |
| WO | 2017031365 A1 | 2/2017 |
| WO | 2019/160480 | 8/2019 |

OTHER PUBLICATIONS

Written Opinion of the ISA for PCT/SE2020/051115 dated Feb. 11, 2021, 6 pages.
Swedish Report for SE1951367-0 mailed Jun. 30, 2020, 2 pages.
Office Action, issued in European Patent Application No. 20833987.9 dated Jul. 24, 2024.

\* cited by examiner bml # METHOD AND CONTROL ARRANGEMENT FOR OPERATING AN AUTONOMOUS AGRICULTURAL VEHICLE This application is the U.S. national phase of International Application No. PCT/SE2020/051115 filed Nov. 24, 2020 which designated the U.S. and claims priority to SE 1951367-0 filed Nov. 28, 2019, the entire contents of each of which are hereby incorporated by reference.

TECHNICAL FIELD

The present disclosure generally relates to barn cleaning and in particular to an autonomous agricultural vehicle comprising a cleaning device suitable for removing manure in a livestock area. The disclosure also relates to a method for operating the autonomous agricultural vehicle and to a computer program for performing the method.

BACKGROUND

One inevitable consequence of animal husbandry is handling of animal excrements such as manure. Removal of animal excrements will herein be referred to as "barn cleaning". Further, animal excrements will herein be referred to as "manure", although there are many other words used for the excrements of different animal types, etc., such as "effluents" or "droppings". There are a number of different solutions for automatic barn cleaning, such as various autonomous agricultural vehicles displacing or collecting the manure, or scrapers, which are typically pulled along an alley by a chain, rope or wire. Common for these solutions are that they operate on a predefined track, typically according to a predefined time schedule.

The autonomously movable agricultural vehicle is typically battery operated. It is typically desirable that the distance travelled for each battery charge is optimized so that the effectiveness of the vehicle is also optimal. WO 2011/062481 A1 discloses an autonomously movable agricultural vehicle for agricultural applications comprising a control circuit to control the motor to adjust the speed of the autonomously movable agricultural vehicle in order to optimize the effectiveness of the battery. The control circuit is configured to set the speed of the autonomously movable agricultural vehicle such that energy drawn from the battery over a predefined distance is minimal.

However, the automatic barn cleaning devices typically run their cleaning routines irrespective of whether cleaning is needed or not, i.e. regardless of the amount of manure to clear. This is identified as inefficient.

SUMMARY

It is an object of the disclosure to alleviate at least some of the drawbacks with the prior art. Thus, it is an object to provide a solution that enables more efficient barn cleaning, as the autonomous agricultural vehicle adapts its cleaning based on when and where cleaning is actually needed.

According to a first aspect, this disclosure proposes a method for operating an autonomous agricultural vehicle in accordance with a cleaning plan, wherein the autonomous agricultural vehicle comprises a cleaning device suitable for moving manure from/in a livestock area. The method comprises monitoring at a plurality of individual times, while operating the autonomous agricultural vehicle in accordance with the cleaning plan, a load quantity representing an amount of material moved by the cleaning device, and adjusting the cleaning plan of the autonomous agricultural vehicle based on a variation in the monitored load quantity among the individual times. The method provides efficient cleaning, as amount of cleaning will be based on need calculated based on historical knowledge. Also, better energy optimization may be achieved, as no unnecessary cleaning is performed.

Furthermore, maintenance and service requirements may decrease, as the autonomous agricultural vehicle is used in a more efficient way.

In some embodiments, the cleaning plan defines a cleaning schedule and/or one or more cleaning routes of the autonomous agricultural vehicle. This may also provide increased animal welfare and safety, as cleaning may be scheduled when and where animals are not present.

In some embodiments, the adjusting comprises adjusting the cleaning plan, such that the variation in the monitored load quantity is reduced. Thereby, higher cleaning efficiency (in terms of amount of material removed per time unit) may be achieved and consequently, the cleaning capacity of the autonomous agricultural vehicle may be increased.

In other words, embodiments of the subject matter described herein could with advantage be used for improving the efficiency of automatic barn cleaning. For example, energy consumption could be minimized by only cleaning when and where needed, and also by ensuring that an automatic barn cleaning device does not travel further than absolute necessary to get the job done.

In some embodiments, the adjusting comprises adjusting the cleaning plan, such that the monitored load quantity stays below a predefined load threshold. Hence, very high loads on the autonomous agricultural vehicle and the cleaning device may be avoided. The consequence is typically less wear on components.

In some embodiments, the variation represents variation over a certain time period and wherein the adjusting of the cleaning plan comprises adjusting a cleaning schedule of the autonomous agricultural vehicle for the certain time period, based on variation over one or more previous certain time periods. In some embodiments, the time period is a working day, one day or 24 hours. In other words, the cleaning schedule is adapted based on when there was historically a large amount of material produced, typically mainly manure. Thereby, a user does not have to create a cleaning schedule, as this would be done by the proposed machine learning software. In other words, the autonomous agricultural vehicle will operate autonomously with none or little human attention required.

In some embodiments, the adjusting of the cleaning plan comprises adjusting a cleaning schedule of the autonomous agricultural vehicle, such that during one cleaning period cleaning is performed more frequently during a time interval corresponding to a first average monitored load, than during a time interval corresponding to a second average monitored load, wherein the first average monitored load is higher than the second average monitored load. In other words, cleaning is performed when it is considered needed.

In some embodiments, the method comprises obtaining, for each individual time, a corresponding position in the livestock area. In these embodiments the variation represents variation in the load quantity among different positions in the livestock area and the adjusting of the cleaning plan comprises adjusting a cleaning schedule of the autonomous agricultural vehicle, based on the variation in the load quantity among different positions in the livestock area. In other words, the cleaning route is adapted based on where there was historically a large amount of material produced, typically mainly manure.

In some embodiments, the adjusting of the cleaning plan comprises adjusting one or more cleaning routes and/or selecting one or more cleaning routes of a plurality of cleaning routes of the autonomous agricultural vehicle, such that cleaning is performed more frequently in areas corresponding to a first average monitored load, than in areas corresponding to second average monitored load, wherein the first average monitored load is higher than the second average monitored load. In other words, cleaning is performed where it is needed.

In some embodiments, the method comprises calculating, based on the monitored load quantity, a material accumulation pattern representing a material accumulation rate in the livestock area, and the adjusting comprises adjusting the cleaning plan, based on the calculated material accumulation pattern. In other words, the amount of material produced historically is estimated and the cleaning plan is adapted accordingly. In some embodiments, the material accumulation pattern describes variation in material accumulation over time.

In some embodiments, the material accumulation pattern comprises a material accumulation map describing variation in material accumulation among different positions in the livestock area. Hence, it is possible to use a multi-dimensional map representing material production in the livestock area to be able to adjust the cleaning plan in an efficient way.

In some embodiments, the method comprises estimating, based on the monitored load quantity, a historical material accumulation rate in the livestock area, and predicting, based on the historical material accumulation rate, a future material accumulation rate in the livestock area. In these embodiments the adjusting comprises adjusting the cleaning plan, based on the predicted future material accumulation rate in the livestock area. Thereby, the future amount of material to be removed may be estimated in an accurate way.

In some embodiments, the method comprises obtaining user input indicative of a desired cleanliness level and wherein the adjusting comprises adjusting the cleaning plan based on the obtained cleanliness level. Thus, a user may set desired cleanliness level based on balance between cost and cleanliness.

In some embodiments, the load quantity is indicative of an amount of energy required to move material being accumulated during a certain time period. In some embodiments, the load quantity comprises at least one of; a power quantity, a pressure quantity, a weight quantity and a flow quantity.

In some embodiments, the method comprises monitoring the load quantity while operating the autonomous agricultural vehicle in the livestock area, while the livestock area is considered being free from material to be removed and calibrating the monitoring, based on the monitored load quantity representing a livestock area free from material. Hence, the monitoring may be calibrated to take constant (or slowly changing) conditions into account. In other words, the constant ingredient of the load quantity is not used when adjusting the cleaning plan.

According to a second aspect, this disclosure proposes a control arrangement for operating an autonomous agricultural vehicle configured to clean a livestock area in accordance with a cleaning plan. The control arrangement is configured to monitor at a plurality of individual times, while operating the autonomous agricultural vehicle in accordance with the cleaning plan, a load quantity representing an amount of material moved by the cleaning device, and to adjust a cleaning plan of the autonomous agricultural vehicle based on variation in the monitored load quantity among the monitored load quantities among the plurality of individual times.

In some embodiments, the control arrangement is configured to perform the method according to one or more of the embodiments of the first aspect.

According to a third aspect, this disclosure proposes an autonomous agricultural vehicle configured to clean a livestock area in accordance with a cleaning plan. The autonomous agricultural vehicle comprises a motor, a power storage, a cleaning device, a load sensor and the control arrangement according to the second aspect. The motor is configured to propel the autonomous agricultural vehicle. The power storage is configured to supply energy to the motor. The cleaning device is configured to move dirt from the livestock area. The load sensor is configured to obtain a load quantity indicative of an amount of material moved by the cleaning device.

According to a fourth aspect, the disclosure relates to a computer program comprising instructions which, when the program is executed by a computer, cause the computer to carry out the method according to the second aspect.

According to a fifth aspect, the disclosure relates to a computer-readable medium comprising instructions which, when executed by a computer, cause the computer to carry out the method according to the second aspect.

DETAILED DESCRIPTION

Figure 1A:
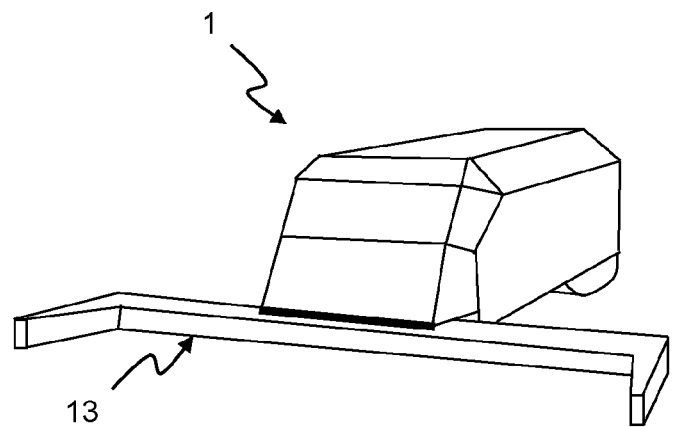
FIG. 1a illustrates an autonomous agricultural vehicle according to some example embodiments.

As previously mentioned, there are many different automatic solutions for cleaning a barn, such as a dairy barn. For example, there are autonomous agricultural vehicles developed for this purpose, which may be equipped with various means for navigation. For example, induction lines or magnets could be fixed in the floor, and the autonomous vehicle could be provided with sensors, which enable the vehicle to be guided by the lines or magnets. Alternatively, the navigation could be performed by means of beacons or transponders placed along a predetermined route, detectable by the autonomous device. The navigation means may thus lead the autonomous device along a predetermined route, which is designed to cover, at some point, as many parts as possible of a barn which need cleaning. A cleaning schedule is normally pre-programmed based on time, such that the automatic barn cleaning device is started and run at certain periods. Hence, traditional autonomous agricultural vehicles typically use a fixed route and a fixed schedule to clean a livestock area. However, considering the fact that the manure load in the barn may vary in time and also in specific livestock areas depending on e.g. how the animals move around, this way of cleaning may be inefficient.

This disclosure introduces an adaptive barn cleaning concept, where cleaning is performed where and when it is needed. Some embodiments of the proposed technique are based on the insight that the behaviour of the animals does typically not vary that much from day to day. Hence, optimal cleaning may typically be achieved by studying animal behaviour during the previous days and to adapt the cleaning thereafter. More specifically it is herein proposed to monitor an amount of material removed by a cleaning device of an operating autonomous agricultural vehicle during barn cleaning and to use the monitored data representing an historical amount of removed material to operate the autonomous agricultural vehicle in a more efficient way.

More specifically, it is herein proposed to measure an amount of material removed by an operating autonomous agricultural vehicle, for example by monitoring the motor load and battery voltage during barn cleaning. Based on the monitored values, software may be used to optimize the cleaning schedule to clean more often when high load was recorder during the day and less when it wasn't high. The load measurement may also make it possible to identify animal traffic pattern and to use them to avoid cleaning in crowded places in order to not disturb the animals (e.g. during feeding time, in a waiting area, etc).

Furthermore, the proposed solution also gives the farmer a possibility to configure level of cleanliness. Hence, the farmer will be able to make compromise between level of cleanliness and distance travelled for each battery charge.

Below, exemplifying embodiments of an autonomous agricultural vehicle and a method for operating an autonomous agricultural vehicle will be described with reference to FIGS. 1-6. The embodiments are intended to be performed by a control arrangement which is associated with an autonomous agricultural vehicle comprising a cleaning device suitable for removing manure a livestock area. The term "associated with" is here intended to cover at least that the control arrangement is operatively connected to the autonomous agricultural vehicle. The control arrangement will be described in more detail further below in association with FIG. 3 The autonomous agricultural vehicle device is suitable for automatic cleaning of a barn in which dairy animals are kept, such as e.g. cow, buffalo, sheep or goat.

Figure 3:
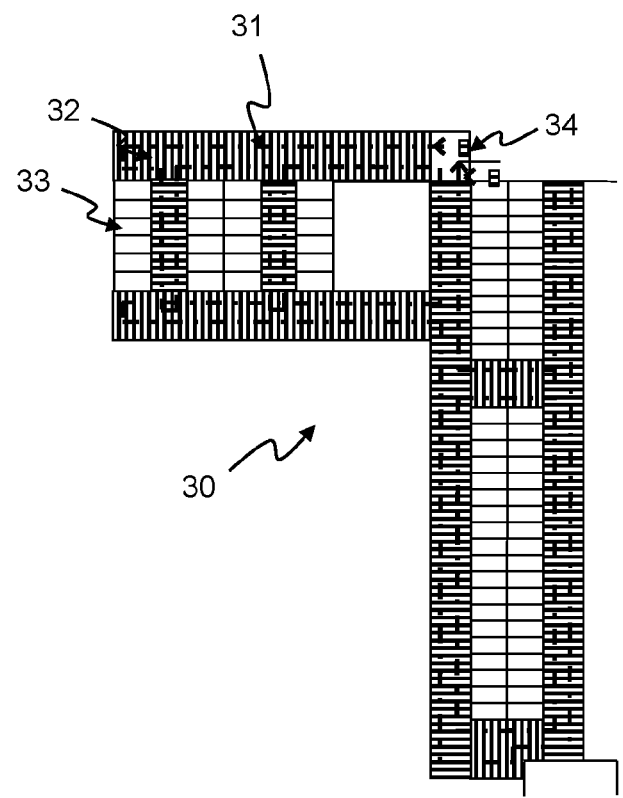
FIG. 3 illustrates a cleaning route of an autonomous agricultural vehicle in a livestock area according to one example embodiment.

FIG. 1a illustrates an autonomous agricultural vehicle 1 comprising a cleaning device 13 suitable for removing manure a livestock area 3 (FIG. 3). The illustrated autonomous agricultural vehicle 1 is a cleaning robot, which can be controlled to navigate and move, relatively freely, in at least two physical dimensions, i.e. is not bound to a fixed track. Hence, the autonomous agricultural vehicle 1 is configured to move around autonomously in livestock buildings or in the field.

Figure 1B:
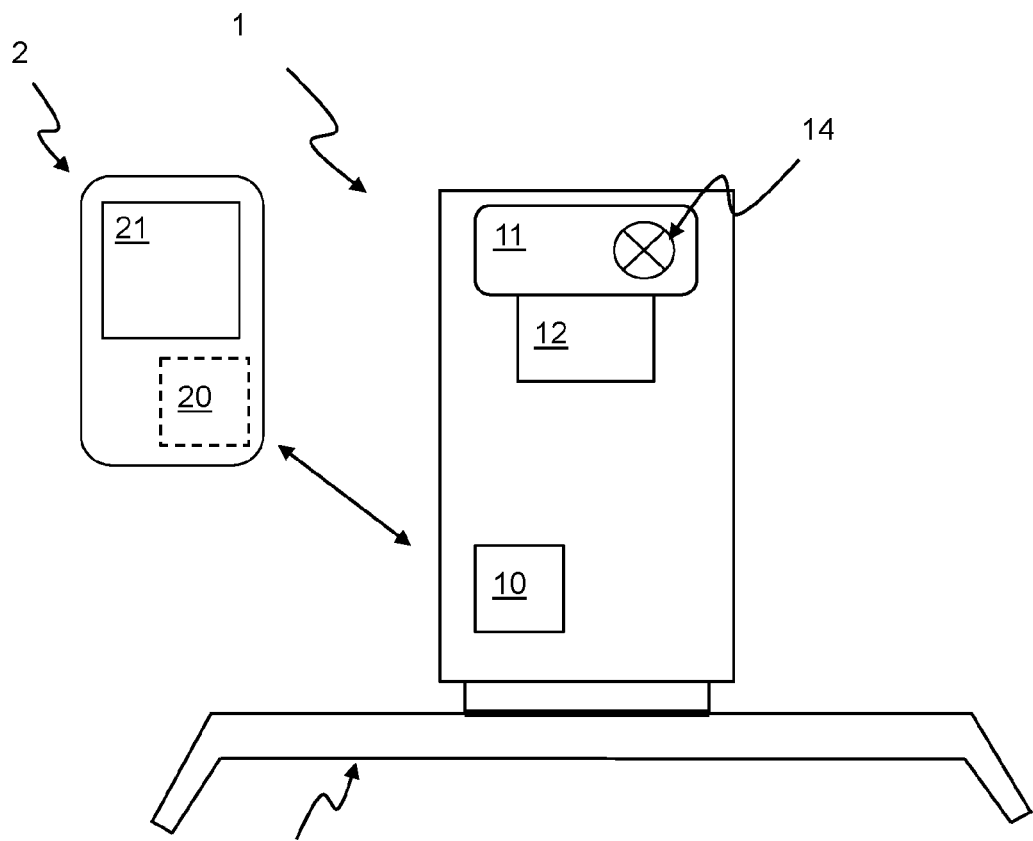
FIG. 1b conceptually illustrates components of the autonomous agricultural vehicle in further detail.

FIG. 1b is a conceptual illustration of the components of the autonomous agricultural vehicle 1 and a user device 2. The illustrated autonomous agricultural vehicle 1 comprises a motor 11, a power storage 12, a cleaning device 13, a load sensor 14 and a control arrangement 10. It must be appreciated that the autonomous agricultural vehicle 1 comprises further components not illustrated in FIG. 1b, such as components for steering, braking and charging the autonomous agricultural vehicle 1 and sensors used for the autonomous control. However, for simplicity only components related to the proposed technique are described herein.

The motor 11 is configured to propel the autonomous agricultural vehicle 1. More specifically, the motor 11 is configured to convert energy provided by the power storage 12 into mechanical force. The motor 11 is for example an electrical motor. The power storage 12 is configured to supply energy to the motor 11. The power storage 12 is for example a battery. The power storage 12 is typically charged by a docking station 34 (FIG. 3) where the autonomous agricultural vehicle 1 is parked between the cleaning sessions.

The cleaning device 13 is a device configured to remove dirt from the livestock area. In the illustrated embodiment the cleaning device is a scraper arranged on the front of the autonomous agricultural vehicle 1. The autonomous agricultural vehicle 1 is is some embodiments operated in a livestock area that has a slatted floor, whereby the scraper will scrape material (e.g. manure) down into holes of the slatted floor. Alternatively, the material may be dumped in ditches along the cleaning route.

In some embodiments the cleaning device 13 comprises a material pick-up arrangement, such as a sucking arrangement (e.g. a vacuum cleaner arranged to suck up material) or a pickup belt. In other words, in some embodiments the autonomous agricultural vehicle comprises a receptacle, such as a tank, and a material pick-up device arranged to move the material into the tank. Such a pick-up device may be used in combination with a scraper arranged to collect material at the pick-up arrangement inlet and/or with a slatted floor. The cleaning device 13 may also or alternatively comprise a rotating brush, a water sprayer and/or any other suitable cleaning devices or combinations thereof.

The load sensor 14 is configured to obtain a load quantity indicative of an amount of material removed by the cleaning device 13. In some embodiments the load sensor 14 is a power sensor arranged to measure power (or energy) required to remove the material. For example, a load sensor may be arranged to sense the power required to propel the autonomous agricultural vehicle 1. Alternatively, the load sensor 14 may be arranged to measure a load of a material pick-up device, e.g. a load on a sucking arrangement or conveyor belt. In other words, the load sensor 14 is configured to measure a load incurred by the removal of material. By deducing the power required for propelling the autonomous agricultural vehicle 1 on a clean floor from the actual power required, the load required to push material may be estimated. In other words, by monitoring the motor power while operating the autonomous agricultural vehicle 1, the amount of material removed by the autonomous agricultural vehicle 1 may be estimated.

If the autonomous agricultural vehicle 1 comprises a receptacle (e.g. a tank), then the amount of removed may be estimated by measuring the volume and/or weight of the material accumulated in the receptacle. In other words, in some embodiments the load sensor comprises a weight sensor configured to measure a weight quantity and/or a volume sensor configured to measure a volume quantity. In some embodiments the load sensor is a flow sensor arranged to measure a flow quantity representing the flow of material into the receptacle.

In some embodiments the load sensor is a force sensor arranged to measure force quantity. The measured pressure may for example correspond to a force required to move the material. For example, a pressure on a scraper or a brush may be measured. In general, the load sensor may comprise any type of sensor or combination of sensors suitable for obtaining an estimate of the amount of material removed by the cleaning device during operation. In some embodiments, the load sensor comprises a battery level monitor. In some embodiments, the load sensor is a meter that receives data from a motor driver or any other device to configured to monitor the load required for the removal of material (direct or indirect), applicable for the purpose of monitoring an amount of material moved by the autonomous agricultural vehicle 1.

The control arrangement 10 is configured to autonomously operate the autonomous agricultural vehicle 1 along a cleaning route. This typically involves propelling, braking and steering the autonomous agricultural vehicle 1. In some embodiments it also involves tracking the position of the autonomous agricultural vehicle 1. The position may be traced using calculations in combination with data from different sensors such as optical sensors, wireless sensors etc. The control arrangement may also be configured to detect obstacles (for example animals) in the cleaning route and to control the autonomous agricultural vehicle 1 to avoid such obstacles. In particular the control arrangement 10 is configured to control the motor 11 to propel the autonomous agricultural vehicle 1.

Figure 2:
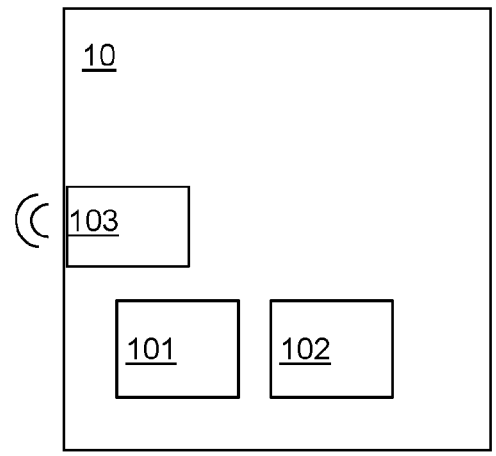
FIG. 2 illustrates a control arrangement according to some embodiments.

FIG. 2 illustrates the control arrangement 10 in more detail, according to some embodiments. The control arrangement 10 comprises hardware and software. The hardware is for example various electronic components on a for example a Printed Circuit Board, PCB. The most important of those components is typically a processor 101 e.g. a microprocessor, along with a memory 102 e.g. EPROM or a Flash memory chip. The software is typically software code that runs in the microcontroller. The control arrangement 10 will be described in further detail below. The illustrated control arrangement 10 also comprises a communication interface 103. The communication interface 103 is configured for communication of signals and/or data between the control arrangement 103 and a remote device, such as the user device 2. The communication interface 103 is configured for wireless communication, using any suitable protocol e.g. Bluetooth or IEEE 802.11. The communication interface 103 may also be configured for wired communication, for example via a docking station. In some embodiments the control arrangement 10 is a device in a functional sense. Hence, the control arrangement 10 may be distributed between a plurality of physical control units, some of which may be located external to the autonomous agricultural vehicle 1.

In some embodiments, autonomous agricultural vehicle 1 is configured to communicate with a user device 2 using the communication interface 103. The user may use the user device 2 to enter user input for use by the autonomous agricultural vehicle 1. Information may also be provided to the user device 2 using the user device 2.

In the illustrated example, the user device is a smartphone. In other embodiments the user device is a laptop, tablet or any other device. The user device 2 comprises a control arrangement 20 and a display 21, here a touch display on which a graphical user interface may be presented. In other embodiments the user device may comprise other devices for receiving user input and providing information to a user, such as buttons. In some embodiments, the user device comprises a software application configured to perform parts of the method proposed herein.

The control arrangement 20 comprises hardware and software. The hardware is for example various electronic components on a for example a Printed Circuit Board, PCB. The most important of those components is typically a processor 101 e.g. a microprocessor, along with a memory 102 e.g. EPROM or a Flash memory chip. The software is typically software code that runs in the microcontroller. The control arrangement 20 also comprises a communication interface configured to enable communication with the control arrangement 103 of the autonomous agricultural vehicle 1.

FIG. 3 illustrates a cleaning route 31 of an autonomous agricultural vehicle 1 in a livestock area 30 according to one example embodiment. FIG. 3 shows a schematic top view of a livestock area 30 in which a cleaning route 31 of the autonomous agricultural vehicle 1 is indicated with a dash-dotted line. The autonomous agricultural vehicle 1 is arranged to operate in an alley 32 of the livestock area (the shaded area). Along the sides of the alley 32, there are stalls 33 where animals can stay, tied or untied. The livestock area 30 is, for example, configured for cows. A docking station 34 for the autonomous agricultural vehicles 1 and can be accessed from the alley 32.

The proposed solution makes it possible to adjust a cleaning plan of an autonomous agricultural vehicle 1 based on amount of material removed by the autonomous agricultural vehicle 1 in previous cleaning sessions. This may be done by for example adjusting a cleaning schedule or a cleaning route of the autonomous agricultural vehicle 1.

Figure 4A:
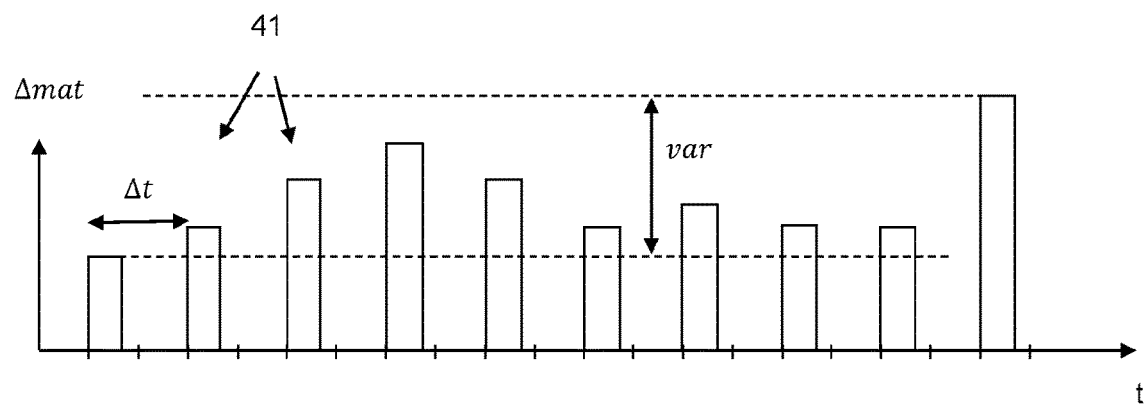
FIGS. 4a and 4b illustrate how the amount of material removed per session when adjusting a cleaning schedule.
Figure 4B:
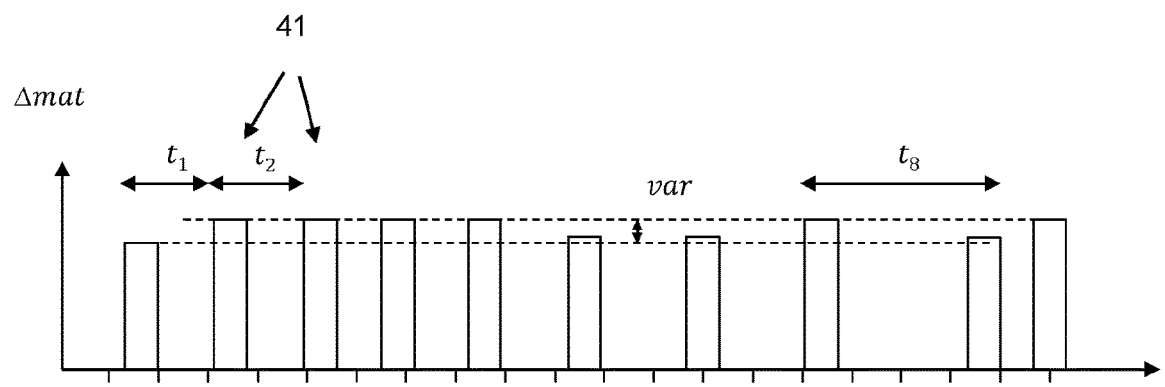

FIGS. 4a and 4b illustrate how the amount of material removed per session is affected when adjusting a cleaning schedule according to some embodiments of the disclosure. A cleaning schedule is a scheme that define timings (i.e. starting times of) of cleaning sessions during a certain time period, e.g. during a day. Amount of material (mainly manure) produced in the livestock area vary between different times of a day. Therefore, if the autonomous agricultural vehicle 1 is programmed to perform cleaning sessions along a predefined cleaning route periodically (with period $\Delta t$) during a day, then the total amount of material, $\Delta mat$, removed in each cleaning session 41 will vary among the cleaning sessions, as illustrated in FIG. 4a.

Experiments have shown, that the amount of produced material vary from day to day. Nevertheless, each day show similar trends specific for a particular livestock area. It is therefore possible to predict material production using data from past days. By using a cleaning schedule based on such a prediction, it is possible to schedule cleaning sessions when needed, instead of using a fixed periodicity.

FIG. 4b is a diagram illustrating that the total amount of material, $\Delta mat$, removed in each cleaning session 41 will vary less among cleaning sessions, if the periodicity is adjusted based on predicted amount of manure, than if periodic scheduling is used. It is clearly visible that the difference vmat between the maximum amount of material and the minimum amount of material removed in one cleaning session (i.e. a variation in amount of material removed) is significantly reduced in the example of FIG. 4b in comparison to in FIG. 4a.

Figure 5A:
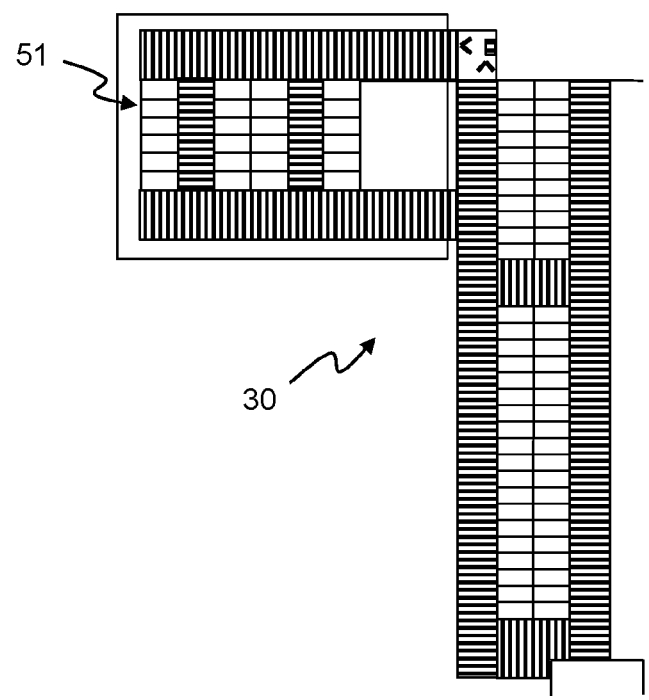
FIGS. 5a and 5b illustrates a route of an autonomous agricultural vehicle in a livestock area.
Figure 5B:
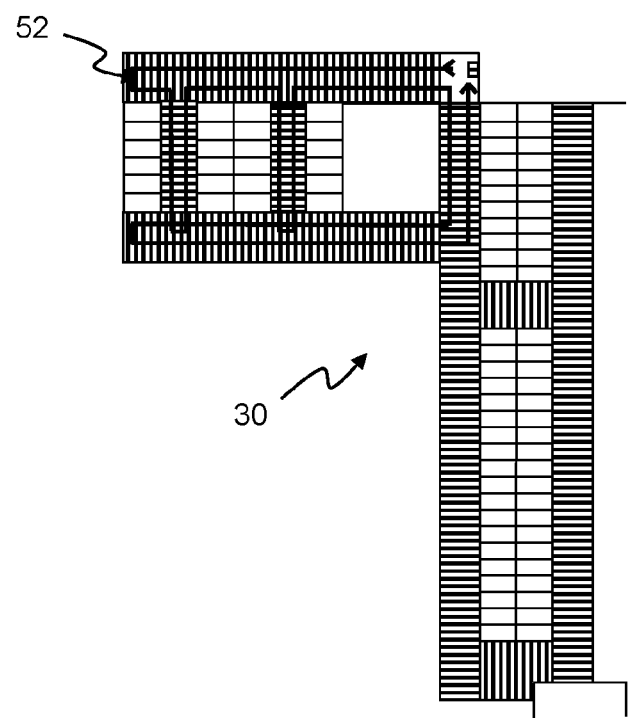

FIGS. 5a and 5b illustrate a route of an autonomous agricultural vehicle in a livestock area. Amount of material (mainly manure) produced in the livestock area vary between different parts of a livestock area. For example, there may be more animals in one part 51 of the livestock area, than in the rest of the livestock area 30. The other part may even be empty. Or the amount of produced material may vary for other reasons. For example, depending on how the animals move etc. Hence, it may not be efficient to operate the autonomous agricultural vehicle 1 along the entire cleaning route 31 illustrated in FIG. 3 during every cleaning session. In other words, the cleaning route of the autonomous agricultural vehicle 1 may be adjusted. For example, a shorter cleaning route 52 may be defined. The shorted route may for example be used every second cleaning session. Alternatively, several different routes (or loops) may be defined and the cleaning plan may then comprise a selected combination of loops selected based on the predicted amount of material produced in the livestock area at different times.

Figure 6:
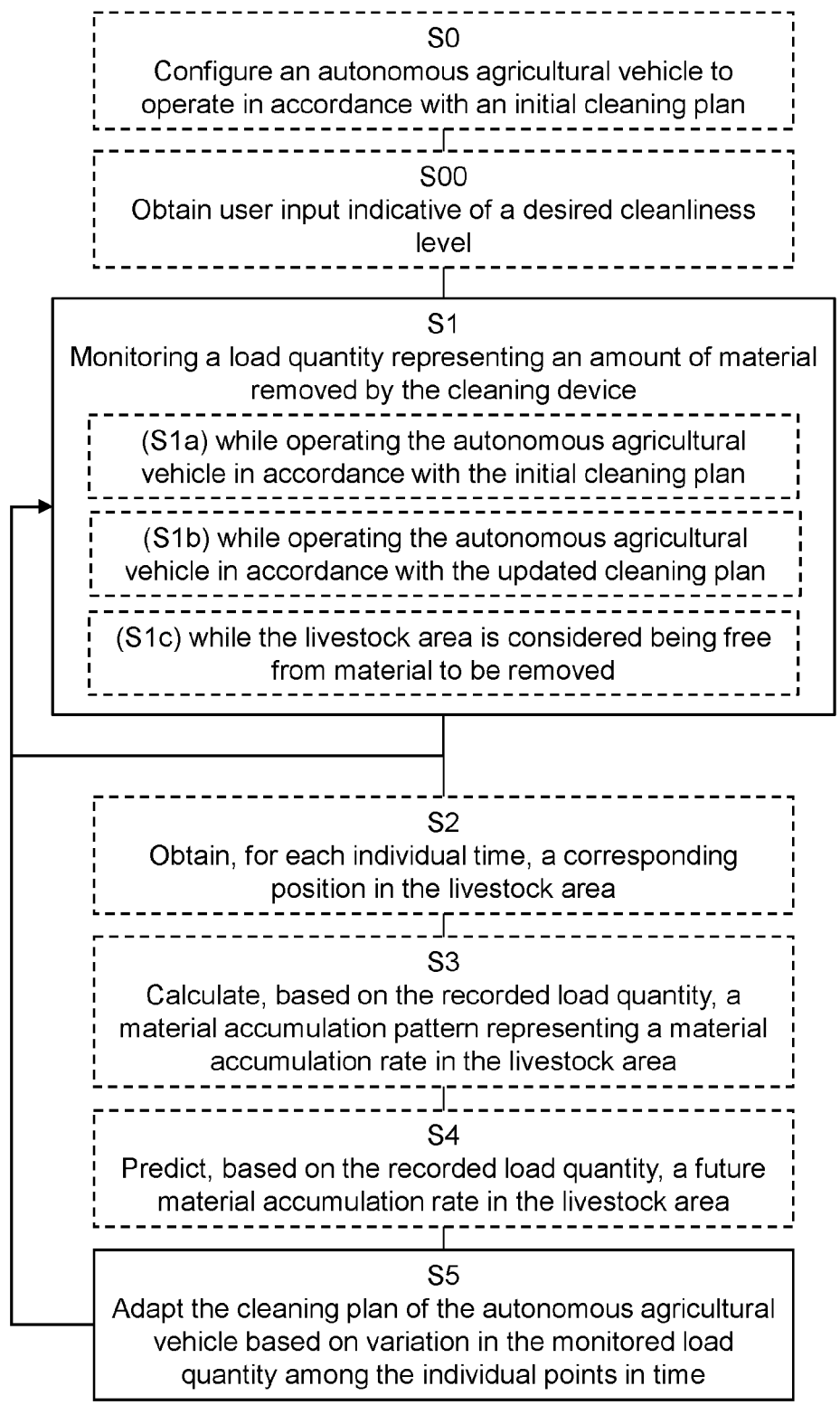
FIG. 6 is a flowchart of the method for operating the autonomous agricultural vehicle.

The proposed technique will now be described in further detail with reference to the flow chart of FIG. 6 and the livestock area of FIG. 2. FIG. 5 shows an exemplifying method of operating an autonomous agricultural vehicle 1 in accordance with a cleaning plan. The method of FIG. 5 is e.g. performed by a control arrangement 10 (FIG. 1b) of the autonomous agricultural vehicle 1 (FIG. 1a). The method may be implemented as a computer program comprising instructions which, when the program is executed by a computer (e.g. a processor in the control arrangement (FIG. 2), cause the computer to carry out the method. According to some embodiments the computer program is stored in a computer-readable medium (e.g. a memory or a compact disc) that comprises instructions which, when executed by a computer, cause the computer to carry out the method.

The method is typically performed continuously or repetitiously during operation of the autonomous agricultural vehicle 1. The autonomous agricultural vehicle 1 is operated according to a cleaning plan that comprises a cleaning schedule and a cleaning route 31. The cleaning route defines where the autonomous agricultural vehicle 1 should drive and the cleaning schedule defined when the autonomous agricultural vehicle 1 should drive. In other words, the cleaning plan defined timings for cleaning sessions of the autonomous agricultural vehicle 1. When the autonomous agricultural vehicle 1 is not cleaning, it is typically charged in a docking station 34 (FIG. 3).

The first time the autonomous agricultural vehicle 1 is put into use in a livestock area 30 it has to be programmed with an initial cleaning plan. As mentioned before, such a cleaning plan typically comprises a cleaning schedule and a cleaning route. In some embodiments the cleaning schedule is pre-programmed by the manufacturer. Alternatively, a user has to configure the cleaning schedule. However, an initial cleaning route comprising one or several possible loops typically needs to be programmed at installation. One loop may e.g. be covering the entire livestock area 30 and is typically used in the initial cleaning plan. However, a few alternative loops that cover only parts of the livestock area 30, may also be configured. In other words, in some embodiments the method comprises configuring S0 the autonomous agricultural vehicle 1 to operate in accordance with an initial cleaning plan.

Initially, the method may also comprise obtaining S00 user input indicative of a desired cleanliness level and wherein. The desired cleanliness level may e.g. comprise a few predefined levels such as level 1, level 2 and level 3.

The user input is for example provided to the control arrangement 10 via the communication interface 103. The communication interface 103 then comprises or be in communication with a user interface (not shown). In some embodiments, the user interface may be presented on a user device such as on the display of the user device (FIG. 1b). The user interface may comprise an input device such as a touch screen, keyboard or microphone.

A suggested cleanliness level may be communicated, e.g. displayed, via the user interface. The suggested cleanliness level is for example a balanced cleanliness level, balanced between cost for cleaning and increased cleanliness. The user may then choose the balanced cleanliness level, or decrease or increase the cleanliness, within limits. User input may thus be one or more touches on the touch screen, one or more keyboard inputs or a voice command.

The autonomous agricultural vehicle 1 is then operated using the initial cleaning schedule. The cleaning route is then typically the same (covering entire livestock area) for each session and the time between the individual cleaning sessions is then typically the same all the time, as illustrated in FIG. 4a. During these initial cleaning sessions training data for adjusting the cleaning schedule is collected. In other words, the method comprises monitoring S1a at a plurality of individual times, while operating the autonomous agricultural vehicle 1 in accordance with the initial cleaning plan, a load quantity representing an amount of material moved by the cleaning device 13. The monitoring comprises sensing the load quantity using the load sensor 14 (FIG. 1b). The load quantity may be any one of the load quantities as described in connection to FIG. 1b. Thus, the amount of material moved by the cleaning device 13 is being measured. Stated differently, during these cleaning sessions, information about the behavior of the animals in the livestock area is gathered. The monitoring S1 may comprise monitoring the load continually while operating the autonomous agricultural vehicle 1 or at one or a few times during each cleaning session. The load quantity is typically monitored during several consecutive cleaning sessions. In some embodiments, the monitoring S1 is performed during each and every cleaning session performed in the livestock area 30. If the cleaning route is along an alley where there is one (or a few) locations to dump material using e.g. a scraper, it may be sufficient that the load quantity is measured just before the material is dumped, i.e. when the amount of material in the scraper 1 is at most and just before the material leaves the scraper.

When training data has been collected, the cleaning plan may be adjusted S5 based on the monitored load quantity, as will be further explained below. However, the monitoring S1 will proceed in the same way anyhow, with the only difference that the cleaning plan is different, i.e. it is adjusted. In other words, the method then comprises monitoring S1b at a plurality of individual times, while operating the autonomous agricultural vehicle 1 in accordance with the adjusted cleaning plan, a load quantity representing an amount of material moved by the cleaning device 13.

It may be desirable to correlate the monitored load quantity with a corresponding position of the the autonomous agricultural vehicle 1. Therefore, in some embodiments, the method comprises obtaining S3, for each individual time, a corresponding position in the livestock area 30. The autonomous agricultural vehicle 1 must typically know its position in the livestock area 30 in order to navigate properly according to the cleaning route and also to avoid obstacles. Hence, the present position is typically already available in the control arrangement 10 or may at least be calculated from information already available.

The monitoring S1 may also comprise saving the value of the sensed load quantity, and corresponding positions if obtained, in a memory, for example the memory 102 of the control arrangement 10 or in remote storage, referred to as a "cloud".

The monitored load quantity represents how much material is removed by the autonomous agricultural vehicle 1. By knowing how much material has been removed, it is also possible to estimate how much material has been produced since the last cleaning session. This "material production rate" is herein referred to as a material accumulation rate. In order to get a correct estimate of this accumulation rate an offset representing constant conditions associated with the livestock area 30 and the autonomous agricultural vehicle 1 typically has to be deduced, as will be further explained below.

The proposed technique is based on the insight that this material accumulation rate changes over time and also between different areas in the livestock area 30. A pattern of those variations may be determined by studying the monitored load quantity. The pattern is herein referred to as a material accumulation pattern. Stated differently, the pattern visualised different trends in the material accumulation, which may be determined based on historically monitored load quantity. Thus, in some embodiments, the method comprises calculating S4, based on the monitored load quantity, a material accumulation pattern representing a material accumulation rate in the livestock area 30. This pattern typically shows how the material accumulation in the livestock varies over a time period, e.g. a day and also between different parts of the day. In other words, a machine learning algorithm is used to predict material accumulation using data from past days. The pattern may identify trends over one day an also trends for particular parts of the livestock area.

The material accumulation pattern may illustrate how the material accumulation rate changes over time. In other words, in some embodiments, the material accumulation pattern describes variation in material accumulation over time. This pattern shows how the material accumulation in the livestock varies over a time period, e.g. during a day. For example, it may be higher at some and lower at some individual times of the day. In a simple example, the accumulation rate of material in the entire livestock area may be illustrated in a diagram as a function of time. The accumulation rate between two cleaning sessions may be estimated by dividing the total amount of material removed in the second cleaning session by the time that have elapsed since the first cleaning session.

In some embodiments a pattern for the next day is created by studying the average accumulation at different times during the previous days. For example, a moving average is used.

The material accumulation pattern may illustrate how the material accumulation rate changes in space. In other words, in some embodiments, the material accumulation pattern comprises a material accumulation map describing variation in material accumulation among different positions in the livestock area. Hence, a pattern may illustrate how the accumulation in different parts of the livestock area. This may be illustrated on a map of the barn where different amounts of material may be indicated by e.g. different patterns as will be illustrated in the example of FIGS. 7a to 7i.

It is of course also possible to estimate a pattern which represents both place and time. Such a pattern would comprise multiple dimensions and may be represented as a map of the livestock area 30.

The method further comprises adjusting S5 the cleaning plan of the autonomous agricultural vehicle 1 based on a variation in the monitored load quantity among the individual times. In other words, the cleaning plan is adjusted to compensate for variations in the amount of produced material. In this way cleaning may be more efficient.

In some embodiments, the variation is a variation between different parts of the livestock area 30. Then the variation is a variation between different points in time within one (or several) individual cleaning session. For example, the average amount of material removed at position A is compared to an average amount of material removed at position B.

In some embodiments, the variation is a variation between different times, e.g. different times of a day. Then the variation is a variation between different points in time of different cleaning sessions. For example, the average amount of material removed during cleaning sessions performed at 08.00 a.m. is compared to an average amount of material removed during cleaning sessions performed at 11.00 a.m.

As mentioned before, a goal is typically to even out a difference between an amount of material removed in the individual cleaning sessions. In other words, in some embodiments, the adjusting S5 comprises adjusting the cleaning plan, such that the variation in the monitored load quantity is reduced. This is typically accomplished by cleaning when and where it is needed. Stated differently, In some embodiments, the adjusting of the cleaning plan comprises adjusting a cleaning schedule of the autonomous agricultural vehicle 1, such that during one cleaning period cleaning is performed more frequently during a time interval corresponding to a first average monitored load, than during a time interval corresponding to a second average monitored load, wherein the first average monitored load is higher than the second average monitored load. In other words, the adjusting S5 should strive at scheduling more cleaning more at times when the material accumulation has historically been high.

In some embodiments, the adjusting S5 comprises adjusting the cleaning plan based on an obtained cleanliness level, for example a cleanliness level input by a user. The desired cleanliness level may define a maximum and/or minimum number of cleaning sessions per time period. Alternatively, the desired cleanliness level may define a maximum and/or minimum distance travelled while cleaning per time period.

In some embodiments, the adjusting of the cleaning plan comprises adjusting one or more cleaning routes of the autonomous agricultural vehicle 1. This means that cleaning is performed more frequently in areas corresponding to a first average monitored load, than in areas corresponding to second average monitored load. The first average monitored load is higher than the second average monitored load.

In other words, the adjusting S5 should strive at scheduling more cleaning more in places where the material accumulation has historically been high. This might be accomplished by amending the last used cleaning route. Alternatively, this may be accomplished by pre-configuring a number of alternative cleaning routes (e.g. different loops) and dynamically selecting one, or a few, of them for each particular cleaning session.

If a material accumulation pattern has been calculated then the adjusting S5 comprises adjusting the cleaning plan, based on the calculated material accumulation pattern. For example, if the pattern indicates that the production of material is higher in certain places and/or at certain times, then the cleaning plan may be adjusted such that more cleaning is performed more frequently in these places and/or at these times, as illustrated in FIG. 5a-b.

In some embodiments, the adjusting S5 comprises adjusting the cleaning plan, such that the monitored load quantity stays below a predefined load threshold. The predefined load threshold may either be fixed, or it may be configurable. For example, it may be based on a cleanliness level, which is for example selected by a user as explained above.

This may be achieved in different ways. Fore example, cleaning may be performed more often when a lot of material is expected to be produced, as illustrated in FIG. 4a-b. If the cleaning device 13 is a scraper, it implies adjusting the cleaning plan such that the estimated amount of material accumulated in the scraper does not exceed a predefined level, as a lot of material would cause a high load on the motor 11. To avoid this the path may be for example be adapted, such that the scraper is emptied more often and/or cleaning sessions should be scheduled more often. This is particularly relevant when the material is collected in a container of the autonomous agricultural vehicle 1, which might otherwise be too full.

If the variation represents variation over a certain time period, then variations over the time period may be analysed. Typically, several previous times periods are averaged to determine such a variation. For example, if the load quantity is always higher in the morning that in the afternoon, then the cleaning schedule may be adapted accordingly. In other words, in some embodiments, the adjusting S5 of the cleaning plan comprises adjusting a cleaning schedule of the autonomous agricultural vehicle 1 for the certain time period, based on variation over one or more previous certain time periods.

If a position of the autonomous agricultural vehicle 1 is obtained, the variation represents variation in the load quantity among different positions in the livestock area 30. Typically, several previous cleaning sessions are averaged to determine such a variation. For example, if the load quantity is always higher in one part 51 (FIG. 5) of the livestock area 30 then in the rest of the livestock area 30, then the cleaning route may be adapted such that more cleaning is performed in this one part 51 (FIG. 5). This may be done by adjusting the cleaning route such that the shorter cleaning route 51 is performed every second time and the entire cleaning route 31 (FIG. 3) is performed every second time. In other words, in some embodiment the adjusting S5 of the cleaning plan comprises adjusting a cleaning schedule of the autonomous agricultural vehicle 1, based on the variation in the load quantity among different positions in the livestock area.

In order to efficiently calculate the amount of material removed by the cleaning device 13 calibration may be required. This may comprise monitoring the load quantity when no material is removed. This may be performed by operating the autonomous agricultural vehicle 1 when the livestock area 30 is clean, i.e. free form material. Then an offset of the load quantity, which is not caused by material removed but by other factors such as friction is estimated. This offset load quantity is typically required to correctly estimate the amount of material removed by the autonomous agricultural vehicle 1. More specifically, the offset typically has to be subtracted from the monitored load quantity in order to get a correct estimation of material removed. In other words, in some embodiment the method comprises calibrating the monitoring S1, based on the monitored load quantity representing a livestock area free from material.

This operation may be done before the autonomous agricultural vehicle 1 is put into use. However, for good results the floor in the livestock area 30 should already be covered with some layer of manure; after some animal presence. Otherwise the autonomous agricultural vehicle 1 will be driving on bare concrete, which may give faulty results. It may also be repeated now and then after the autonomous agricultural vehicle 1 is put into use, because the offset may change due to e.g. wear in hardware components or because the foundation changes. In other words, in some embodiments, the method comprises monitoring S1c the load quantity while operating the autonomous agricultural vehicle 1 in the livestock area, while the livestock area 30 is considered being free from material to be removed. Such an operation is for example performed at night, when the animals are not disturbed.

In one non-limiting illustrative example, an operator wants to operate an autonomous agricultural vehicle 1 in a livestock area 30. The operator desires a balanced cleanliness level, which is a compromise between cleanliness and power consumption. The operator makes an input to the control arrangement 10 via the remote interface, requesting the balanced cleanliness level. The control arrangement 10 thus obtains S00 user input indicative of the desired cleanliness level.

The user also configures an initial cleaning route of the autonomous agricultural vehicle 1. The initial cleaning route is in this example the route 31 defined in FIG. 3, which covers all alleys of the livestock area 20. While configuring the route, other map data related to the livestock area 30 is also entered, such that the control arrangement 10 has information about where in the livestock area it may drive. Hence, the control arrangement 10 is configured with information about other paths that may alternatively be used.

In this example, the control arrangement 10 selects, based on the input cleanliness level, an initial cleaning schedule comprising nine individual cleaning sessions per time period, with the same time interval in-between. The initial cleaning schedule has a time period of one day. The cleaning sessions are here referred to No. 1, No. 2 . . . No. 9.

In other words, the autonomous agricultural vehicle 1 is now configured S0 to operate in accordance with an initial cleaning plan. The autonomous agricultural vehicle 1 is then operated in accordance with the initial cleaning plan during a plurality of days. In this example, the initial cleaning plan is performed four days. Thus, nine cleaning sessions (No. 1-No. 9) are performed every day.

A load sensor 14 had previously been installed inside a motor controller (not shown) controlling the motor 11 to propel the autonomous agricultural vehicle 1 (without interference with control signals). This load sensor monitors a load on the motor 11, here by measuring the power supplied to the motor 11. As explained above, this load is indicative of the current amount of material pushed by the cleaning device 13, e.g. a scraper, of the autonomous agricultural vehicle 1. The load quantity is monitored S1a continually at individual points in time while cleaning is performed according to the initial cleaning plan. For each monitored load quantity, a corresponding position is also obtained S2. For each position where the load quantity is monitored, a corresponding material accumulation rate may be estimated by studying how much the load quantity has increased since the previous load quantity that was obtained and dividing this increase by the time that passed since the previous load quantity was obtained. Typically, it is most relevant to observe the load quantity, after deducing an offset representing "no material removed", as discussed above. If the scraper has been emptied in-between, the accumulation at the previous load quantity would of course be zero.

Figure 7:
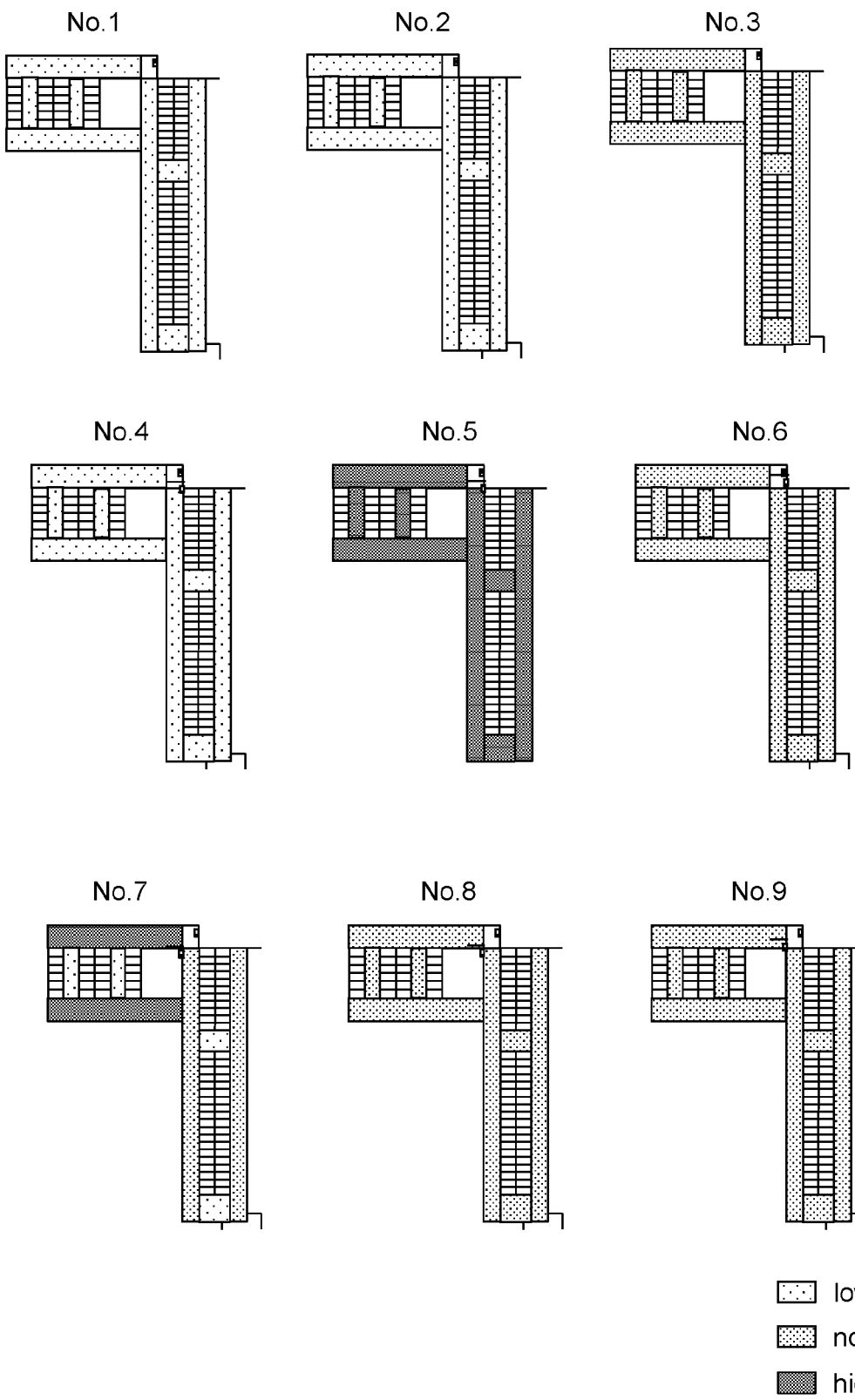
FIG. 7 illustrates an example material accumulation pattern.

The data is stored in the cloud. The control arrangement 10 is thus configured to communicate with a remote storage, here referred to as "the cloud". A material accumulation pattern is then calculated S3 using data collected during the cleaning sessions (No. 1-No. 9) during these initial four days. In this example, a material accumulation rate representing one specific position and one specific session No. is calculated by averaging the material accumulation rate for the position and session No. over the past four days. In the example of FIG. 7, the resulting pattern is presented as maps (one for each cleaning session No. 1-No. 9), where the material accumulation rates at different positions in the barn are presented using different patterns, where the density of the pattern corresponds to the material accumulation rate ("low", "normal", "high"), This estimated material accumulation pattern for the past four days is then used to predict S4 a material accumulation rate in the livestock area during for the next day, i.e. a future material accumulation rate. In this example, it may be noted that the material accumulation rate before cleaning session No. 1 and between cleaning session No. 1 and No. 2. is very low. For example, it is below a predefined threshold representing "low accumulation". It may be noted that the material accumulation rate between cleaning session No. 4 and No. 5 and between cleaning session No. 6 and No. 7 is very high. For example, it is above a predefined threshold representing "high accumulation". Between cleaning session No. 6 and No. 7, it is only too high in one part 32 of the livestock area. Between the other cleaning sessions, the material accumulation is considered "normal". Note that these thresholds may be different for different cleanliness levels.

The adjusting S5 of the cleaning plan is then made based on these findings. Hence in this example, the adjusting comprises omitting session No. 1 as it is anticipated that all material accumulated before session No. 2 may be removed in one single cleaning session. Furthermore, one extra cleaning session may be inserted between cleaning session No. 4 and No. 5, to avoid high loads in session No. 5. In addition, one extra cleaning session may be inserted between cleaning session No. 6 and No. 7, but only covering the part of the livestock area where the material accumulation rate exceeded the threshold representing "high accumulation".

The next day, the autonomous agricultural vehicle 1 is operated according to the adjusted cleaning plan. The load quantity is then monitored S2b while performing the cleaning sessions in accordance with the updated cleaning schedule. Thereafter, the steps S3-S5 are repeated using the monitored load for the cleaning sessions performed during the four latest cleaning schedules. Thus, data from the three latest performed time periods when the initial cleaning plan was used, plus data from the last time period when the adjusted cleaning schedule was used.

The cleaning plan may thus be adjusted for variations in the monitored data each day. The method may be performed more or less automatically. In some embodiments, the desired cleanliness level may be fix or predetermined. The method may then be performed totally automatically. Then, the user does not have to create any cleaning schedule manually. The cleaning process may thus be optimized regarding one or more of: power consumption, machine wear, maintenance and service time, animal welfare, safety.

It must be anticipated that the illustrative example described above is a simplified example. In a real implementation the algorithm may be made much more complex, using for example machine learning algorithms. For example, the timings of several or all of the cleaning sessions might be slightly adjusted. Also, the cleaning routes may be adjusted for several or all of the cleaning sessions. For example, small segments of the routes might be skipped or added, to adapt the cleaning to the predicted material accumulation in the livestock area.

The disclosure also relates to a corresponding control arrangement 10 for operating an autonomous agricultural vehicle 1 configured to clean a livestock area 30 in accordance with a cleaning plan, see FIG. 2. More particularly, the control arrangement 40 is configured to monitor at a plurality of individual times, while operating the autonomous agricultural vehicle 1 in accordance with the cleaning plan, a load quantity representing an amount of material moved by the cleaning device 13, and to adjust a cleaning plan of the autonomous agricultural vehicle 1 based on variation in the monitored load quantity among the monitored load quantities among the plurality of individual times.

The control arrangement 40, or more specifically a processor 41 of the control arrangement 40, is configured to cause the control arrangement 40 to perform all aspects of the method described in FIG. 5. This is typically done by running computer program code stored in the memory 42 in the processor 41 of the control arrangement 40.

The terminology used in the description of the embodiments as illustrated in the accompanying drawings is not intended to be limiting of the described method; control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A method for operating an autonomous agricultural vehicle that includes a cleaning device and a load sensor, the method comprising:
   while operating the autonomous agricultural vehicle in accordance with a cleaning plan, monitoring by the load sensor at a plurality of individual times a load quantity representing an amount of manure moved by the cleaning device, wherein the cleaning plan defines at least one of a cleaning schedule and one or more cleaning routes of the autonomous agricultural vehicle;
   adjusting the cleaning plan of the autonomous agricultural vehicle based on a variation in the monitored load quantity among the plurality of individual times; and
   moving the manure in a livestock area in accordance with the cleaning plan.

2. The method according to claim 1, wherein the adjusting causes the variation in the monitored load quantity to be reduced.

3. The method according to claim 1, wherein the adjusting causes the monitored load quantity to stay below a predefined load threshold.

4. The method according to claim 1,
   wherein the variation is defined over a certain time period, and
   wherein the adjusting comprises adjusting a cleaning schedule of the autonomous agricultural vehicle for the certain time period, based on a variation over one or more previous certain time periods.

5. The method according to claim 4, wherein the time period is a working day or 24 hours.

6. The method according to claim 4, wherein the adjusting comprises adjusting the cleaning schedule of the autonomous agricultural vehicle such that during one cleaning period cleaning is performed more frequently during a time interval corresponding to a first average monitored load, than during a time interval corresponding to a second average monitored load, wherein the first average monitored load is higher than the second average monitored load.

7. The method according to claim 1, further comprising:
obtaining, for each individual time of the individual times, a corresponding position of the autonomous agricultural vehicle in the livestock area, and
wherein the variation is defined by the load quantity among different positions in the livestock area, and
wherein the adjusting of the cleaning plan comprises adjusting the cleaning schedule of the autonomous agricultural vehicle, based on the variation in the monitored load quantity among the different positions in the livestock area.

8. The method according to claim 7, wherein the adjusting comprises adjusting the cleaning route of the autonomous agricultural vehicle, such that cleaning is performed by the autonomous agricultural vehicle more frequently in areas corresponding to a first average monitored load, than in areas corresponding to second average monitored load, wherein the first average monitored load is higher than the second average monitored load.

9. The method according to claim 1, further comprising:
calculating, based on the monitored load quantity, a material accumulation pattern representing a material accumulation rate in the livestock area, and
wherein the adjusting adjusts the cleaning plan based on the calculated material accumulation pattern.

10. The method according to claim 9, wherein the material accumulation pattern describes a variation in material accumulation over time.

11. The method according to claim 9, wherein the material accumulation pattern comprises a load accumulation map describing a variation in material accumulation among different positions in the livestock area.

12. The method according to claim 1, further comprising:
calibrating the monitoring by monitoring the load quantity while operating the autonomous agricultural vehicle in the livestock area while the livestock area is considered being free from manure to be removed, the calibrating based on the monitored load quantity representing the livestock area free from manure.

13. The method according to claim 1, further comprising:
estimating, based on the monitored load quantity, a historical material accumulation rate in the livestock area; and
predicting, based on the historical material accumulation rate, a future material accumulation rate in the livestock area,
wherein the adjusting adjusts the cleaning plan based on the predicted future material accumulation rate in the livestock area.

14. The method according to claim 1, further comprising:
obtaining a user input indicative of a desired cleanliness level, and
wherein the adjusting adjusts the cleaning plan based on the obtained cleanliness level.

15. The method according to claim 1, wherein the load quantity is indicative of an amount of energy required to move manure being accumulated during a certain time period.

16. The method according to claim 1, wherein the load quantity comprises at least one from the group consisting of: a power quantity, a pressure quantity, a weight quantity, and a flow quantity.

17. A control arrangement for operating an autonomous agricultural vehicle, comprising:
a processor, the processor configured to:
while operating the autonomous agricultural vehicle in accordance with a cleaning plan, monitor by a load sensor at a plurality of individual times a load quantity representing an amount of manure moved by a cleaning device, wherein the cleaning plan defines at least one of a cleaning schedule and one or more cleaning routes of the autonomous agricultural vehicle;
adjust the cleaning plan of the autonomous agricultural vehicle based on a variation in the monitored load quantity among the monitored load quantities among the plurality of individual times; and
clean a livestock area in accordance with the cleaning plan.

18. An autonomous agricultural vehicle, the autonomous agricultural vehicle comprising:
a motor configured to propel the autonomous agricultural vehicle;
a power storage configured to supply energy to the motor;
a cleaning device comprising at least one of a scraper and vacuum cleaner configured to move dirt from a livestock area;
a load sensor configured to obtain a load quantity indicative of an amount of manure moved by the cleaning device; and
a control arrangement, comprising a processor, configured to:
operate the autonomous agricultural vehicle in accordance with a cleaning plan,
monitor, during the operating of the autonomous agricultural vehicle, at a plurality of individual times a load quantity representing an amount of material manure moved by the cleaning device, wherein the cleaning plan defines at least one of a cleaning schedule and one or more cleaning routes of the autonomous agricultural vehicle,
adjust the cleaning plan of the autonomous agricultural vehicle based on a variation in the monitored load quantity among the monitored load quantities among the plurality of individual times; and
clean the livestock area in accordance with the cleaning plan.

19. A non-transitory computer readable medium comprising instructions which, when is executed by a computer, cause the computer to carry out the method according to claim 1.

* * * * *